(12) United States Patent
Takahashi et al.

(10) Patent No.: US 7,750,525 B2
(45) Date of Patent: Jul. 6, 2010

(54) ELECTRIC ROTATING MACHINE

(75) Inventors: Kazuhiko Takahashi, Hitachi (JP);
Mitsuru Saeki, Hitachinaka (JP);
Kenichi Hattori, Hitachiota (JP);
Masami Sukeda, Takahagi (JP); Akihito Nakahara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/843,698

(22) Filed: Aug. 23, 2007

(65) Prior Publication Data
US 2008/0088196 A1   Apr. 17, 2008

(30) Foreign Application Priority Data
Oct. 16, 2006   (JP)   ............... 2006-281031

(51) Int. Cl.
*H02K 1/00* (2006.01)
*H02K 3/00* (2006.01)

(52) U.S. Cl. ............... 310/179; 310/180; 310/184; 310/198; 310/201; 310/206

(58) Field of Classification Search ............... 310/179, 310/180, 198, 201, 184, 206; H02K 1/00, H02K 3/00
See application file for complete search history.

(56) References Cited

U.S. PATENT DOCUMENTS

| | | | | |
|---|---|---|---|---|
| 3,201,627 A | * | 8/1965 | Harrington | 310/198 |
| 3,476,964 A | * | 11/1969 | Willyoung | 310/198 |
| 5,654,602 A | * | 8/1997 | Willyoung | 310/179 |
| 5,982,068 A | * | 11/1999 | Umeda et al. | 310/206 |
| 6,181,044 B1 | * | 1/2001 | Umeda et al. | 310/201 |
| 6,326,715 B1 | * | 12/2001 | Asao et al. | 310/180 |
| 6,476,530 B1 | * | 11/2002 | Nakamura et al. | 310/201 |
| 6,825,589 B2 | * | 11/2004 | Kouda et al. | 310/207 |
| 7,034,509 B2 | * | 4/2006 | Kusko | 322/90 |
| 2003/0011268 A1 | * | 1/2003 | Even et al. | 310/179 |
| 2004/0061400 A1 | * | 4/2004 | Fukushima et al. | 310/184 |
| 2004/0119359 A1 | * | 6/2004 | Neet | 310/184 |
| 2005/0012423 A1 | * | 1/2005 | Yasuhara et al. | 310/201 |

FOREIGN PATENT DOCUMENTS

| | | |
|---|---|---|
| EP | 0 975 082 | 1/2000 |
| JP | 2000-050549 | 2/2000 |
| JP | 2001-309597 | 11/2001 |
| JP | 2005-110361 | 4/2005 |

OTHER PUBLICATIONS

G. Klempner, et al., "Operation and Maintenance of Large Turbo-Generators" IEEE Press, 2004, p. 62.
European Search Report issued in European Patent Application No. 07016662.4 on Mar. 12, 2010.

* cited by examiner

*Primary Examiner*—Quyen Leung
*Assistant Examiner*—John K Kim
(74) *Attorney, Agent, or Firm*—Antonelli, Terry, Stout & Kraus, LLP.

(57) ABSTRACT

An electric rotating machine comprising a stator core having a plurality of slots that are equally spaced on the inner surface of the stator core in the peripheral direction, a rotor that rotates inside the stator core, and an armature winding that is applied to each of the slots, wherein the armature winding is made up with a plurality of serially-connected single-turn coils that are respectively applied to the slots and the serially-connected coils of respective phases are connected in parallel.

10 Claims, 11 Drawing Sheets

US 7,750,525 B2

ELECTRIC ROTATING MACHINE

CLAIM OF PRIORITY

The present application claims priority from Japanese application serial No. 2006-281031, filed on Oct. 16, 2006, the content of which is hereby incorporated by reference into this application.

FIELD OF THE INVENTION

The present invention relates to an electric rotating machine that is equipped with serially-connected armature windings.

DESCRIPTION OF RELATED ART

A power generator is equipped with a stator core that has a plurality of axially-extending slots on the inner periphery, an armature winding that is set in each of the slots, and a rotor that rotates inside the stator core. In a general large generator, two layers of armature windings are formed in a single slot. One of the two layers in this slot is connected to one of two layers in another slot of the stator core to form a single turn coil. The series connection of a plurality of single-turn coils facilitates power generation of higher voltages.

The capacity of a power generator is determined by the product of voltage and current. Therefore, a higher voltage or current is required to increase the capacity of the generator. However, increasing the voltage is restricted judging from a point of view of dielectric strength. Similarly, increasing the current is restricted since the temperature goes higher as the current becomes greater. Accordingly, voltage and current increases have been balanced to increase the capacity of the generator. As one of such measures, armature windings of the generator are connected in parallel and the output voltage is reduced below the dielectric strength. The number of parallel circuits of the armature winding is, for example, 1, 2, 3, or 4. (See the following patent and non-patent documents.)

"Operation and Maintenance of Large Turbo-Generators" IEEE PRESS, 2004, P. 62

Japanese Patent Laid-open No. 2000-50549 (FIG. 1)

Japanese Patent Laid-open No. 2001-309597 (FIG. 1)

SUMMARY OF THE INVENTION

The output voltage of a generator is proportional to the reciprocal of the number of parallel circuits. If the output voltage is assumed to be 1.0 when the number of parallel circuits is 1, the output voltages are respectively 0.5, 0.33, 0.25, and so on (which respectively is the quotient obtained by dividing 1 by an integer) when the number of parallel circuits are 2, 3, 4, and so on. Therefore, since the voltage of a 2-parallel circuit is ½ of the voltage of a 1-parallel circuit, a great design change such as changing the length of stator core of the generator (electric rotating machine) or changing the number of slots is required to control the output voltage from the specifications of the 1- or 2-parallel circuit.

The purpose of the present invention is to provide an electric rotating machine that generates voltages between a voltage that is an integral multiple of the output voltage when the number of parallel connections of the armature winding is 1 and a voltage obtained by dividing the integral-multiple voltage by another integer.

To solve the above problems, the present invention is characterized by an electric rotating machine equipped with a stator core having a plurality of slots that are formed in an inner peripheral face of the stator and equally spaced in the peripheral direction, a rotor that rotates inside the stator core, and an armature winding that is applied to the slots, wherein the armature winding is made with a plurality of serially-connected single-turn coils that are respectively applied to the slots and the serially-connected coils of respective phases are connected in parallel.

It is possible to obtain output voltages that are integral multiples of a voltage that is output when the number of parallel connections is 1 by connecting single-turn coils in series. Further, it is possible to obtain voltages that are one second, one third, one fourth, and so on of the output voltage by connecting single-turn coils in parallel. Therefore, it is possible to obtain intermediate output voltages by connecting the serially-connected series coils in parallel. For example, a voltage that is two thirds of the output voltage can be obtained by forming two layers of the armature winding and connecting three serially-connected 2-turn coils in parallel for each phase.

The present invention can provide an electric rotating machine that can output voltages between a voltage that is an integral multiple of an output voltage when the number of parallel connections of the armature winding is 1 and a voltage that is obtained by dividing the voltage of the integral multiple of the output voltage by another integer.

DETAILED DESCRIPTION OF THE PREFERRED EMBODIMENT

Embodiment 1

Figure 1:
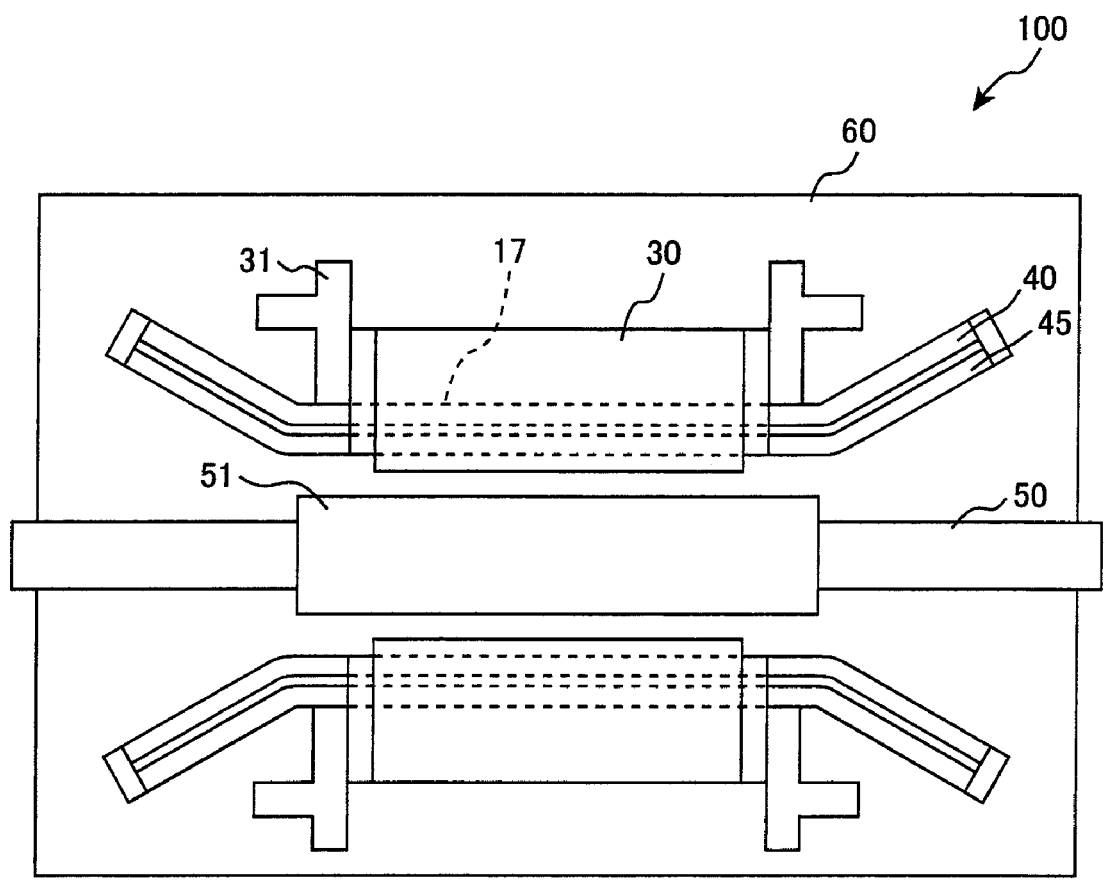
FIG. 1 is a schematic diagram of an electric rotating machine that is a first embodiment of the present invention.

FIG. 1 is a schematic diagram of an electric rotating machine that is a first embodiment of the present invention.

The electric rotating machine 100 is a 3-phase turbine generator and mainly equipped with a stator core 30 including a plurality of slots 17, armature windings 40 and 45, a rotor 51 that rotates about an axis of rotation 50, and a stator frame 60 that holds or secures these components.

Here, the slots 17 are equally spaced on the inner circumference of the stator core 30 in the peripheral direction. The rotor 51 is cylindrically shaped and equipped with a field winding (not shown in the figure) on it to form a plurality of magnetic poles. The stator core 30 is positioned oppositely to the rotor 51 with a predetermined gap between the inner circumference of the stator core and the outer circumference of the rotor 51 and holds both ends of the rotor shaft with end clamps 31. The armature windings 40 and 45 extend in the axial direction of the stator core. They are divided into several layers in each of the slots 17, and accommodated there. One end of the rotor shaft 50 is connected to a steam or gas turbine (not shown in the figure).

Figure 2:
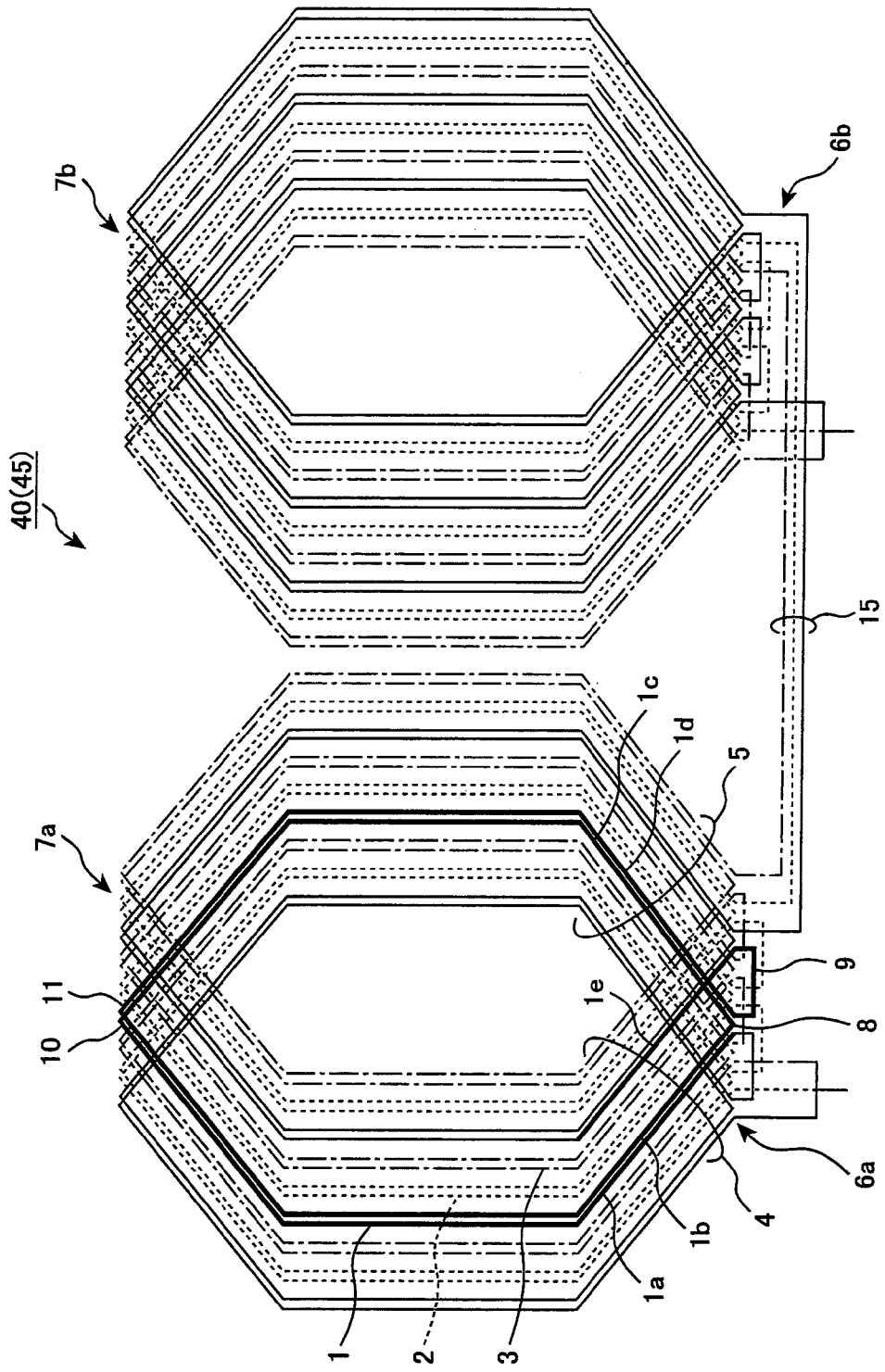
FIG. 2 is a winding diagram of one phase of the armature winding which is the first embodiment of the present invention.

FIG. 2 is a winding diagram of one phase of the armature windings 40 and 45. The connections of the other two phases are respectively shifted 120 and 240 degrees relative to the connection of this phase. FIG. 2 shows an example of 3-phase 2-pole electric rotating machine with 54 slots. However, the numbers of poles and slots are not limited thereto.

In this embodiment, the armature winding has four layers in the radial direction inside a single slot. Two outer layers are called bottom coils and two inner layers are called top coils. In other words, the armature winding is made up of a first bottom coil layer, a second bottom coil layer, a first top coil layer, and a second top coil layer. Further, the armature winding is made up of three parallel circuits (parallel circuit 1, parallel circuit 2, and parallel circuit 3). These circuits are respectively identified by a solid line, a dotted line, and a dash-dot line in the figure. Two parallel lines of each parallel circuit indicate that the armature winding in a single slot forms a 2-turn coil that connects two layers in series. Although in this embodiment the armature windings are positionally identified by the bottom coils 4 and top coils 5, it will be natural that they can be reversed upside down.

An example will be explained below to start to wind the armature winding 1a of the first bottom coil of the parallel circuit 1 from the connection side 6a. Here, it is defined that the connection side 6a is equipped with a connecting terminal that will be connected to the outside and that the opposite side without a connecting terminal is the non-connection side 7a. The armature winding that is required for explanation is drawn with bold lines in the figure. The armature winding 1a of the first layer of the bottom coil is connected to the armature winding 1c of the first layer of the top coil by means of a connecting piece 10. The armature winding 1c of the first layer of the top coil is returned to the connection side 6a and connected to the armature winding 1b of the second layer of the bottom coil by means of a connecting piece 8. With this, a first turn is completed. Then, the armature winding 1b of the second layer of the bottom coil is connected to the armature winding 1d of the second layer of the top coil by means of a connecting piece 11 at the non-connection side 11. The armature winding 1d of the second layer of the top coil is returned to the connection side 6a and the second turn is completed. With this, a 2-turn coil that connects two layers in series is completed. In this case, it is necessary that the first turn and the second turn are identical in the coil pitch of the armature winding and further, the coil pitch at the connection side 6a is equal to that at the non-connection side 7a. The armature winding 1d of the second layer of the top coil is connected to the armature winding 1c of the first layer of the bottom coil of the next armature winding 1e of the parallel circuit 1 by means of a connecting piece 9 of connection pitch of three at the connection side 6a. With this, three parallel circuits are formed. In the similar way, a winding of one pole is formed. Then the winding of this pole is connected to the winding of the next pole by means a connecting wire 15 at the connection side 6b. These steps are repeated to form the parallel circuits 2 and 3.

Figure 3:
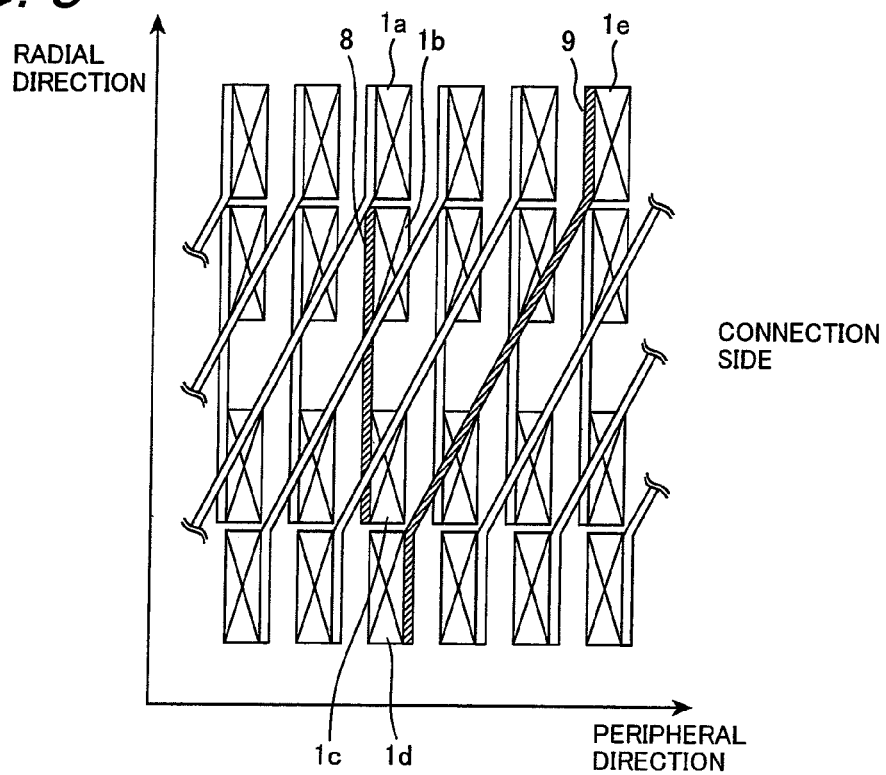
FIG. 3 shows a coil end connecting part of the first embodiment of the present invention at the connection side.
Figure 4:
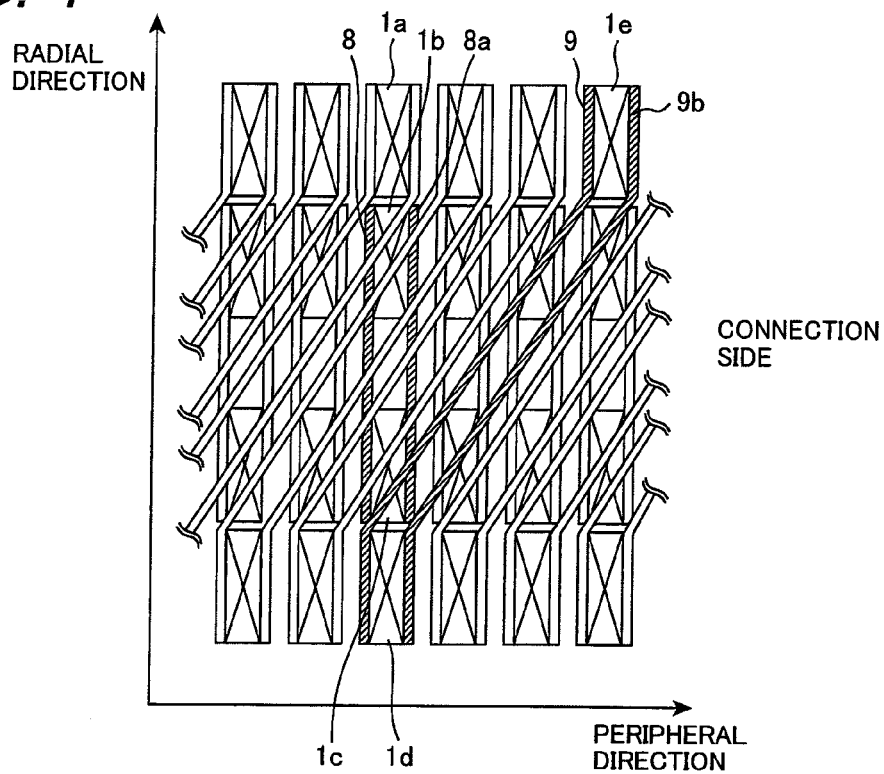
FIG. 4 shows a coil end connecting part which is the modification of the armature winding of the first embodiment of the present invention at the connection side.

FIG. 3 shows a coil end connecting part at the connection side 6a which is viewed from the axis of rotation. The horizontal axis indicates the peripheral direction and the vertical axis indicates the radial direction. Armature windings are arranged in the order of the armature winding 1a of the first layer of the bottom coil, the armature winding 1b of the second layer of the bottom coil, the armature winding 1c of the first layer of the top coil, and the armature winding 1d of the second layer of the top coil (from the outer diameter side to the inner diameter side). By the way, parts required for explanation are marked with a bold black line in FIG. 3. At the connection side 6a (see FIG. 2), the armature winding 1b of the second layer of the bottom coil is connected to the armature winding 1c of the first layer of the top coil by means of a connecting piece 8. The armature winding 1d of the second layer of the top coil is connected to the armature winding 1e of the first layer of the bottom coil which is the next armature winding by means of connecting piece 9 of connection pitch of three. The armature windings are electrically connected to the connecting pieces by brazing or the like. Although this embodiment uses bar-shaped conductive materials for the connecting pieces, the connecting pieces can have any shapes as long as the materials are conductive. Although this embodiment uses one connecting piece 8, 9 on one side of the armature winding, the connecting pieces (2 pieces) can be provided on both sides of the armature winding as shown in FIG. 4.

Figure 5:
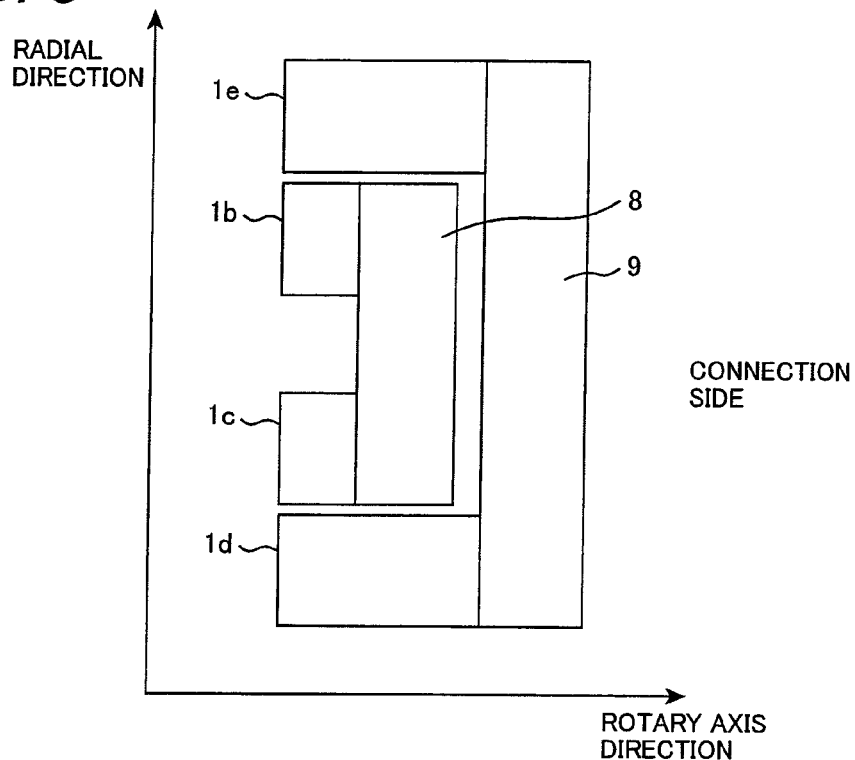
FIG. 5 shows a coil end connecting part of the armature winding of the first embodiment of the present invention at the connection side.

FIG. 5 shows a coil end connecting part at the connection side 6a which is viewed from the axis of rotation. The horizontal axis indicates the axial direction and the vertical axis indicates the radial direction. The armature winding 1e of the first layer of the bottom coil, the armature winding 1a that is behind the armature winding 1e (that is, under the paper of FIG. 5) and is not shown in this figure, and the armature winding 1d of the second layer of the top coil are made longer in the axial direction. Contrarily, the armature winding 1b of the second layer of the bottom coil and the armature winding 1c of the first layer of the top coil are made shorter in the axial direction. This is to prevent overlapping of the connecting piece 8 and the connecting piece 9 of connection pitch 3.

Figure 6:
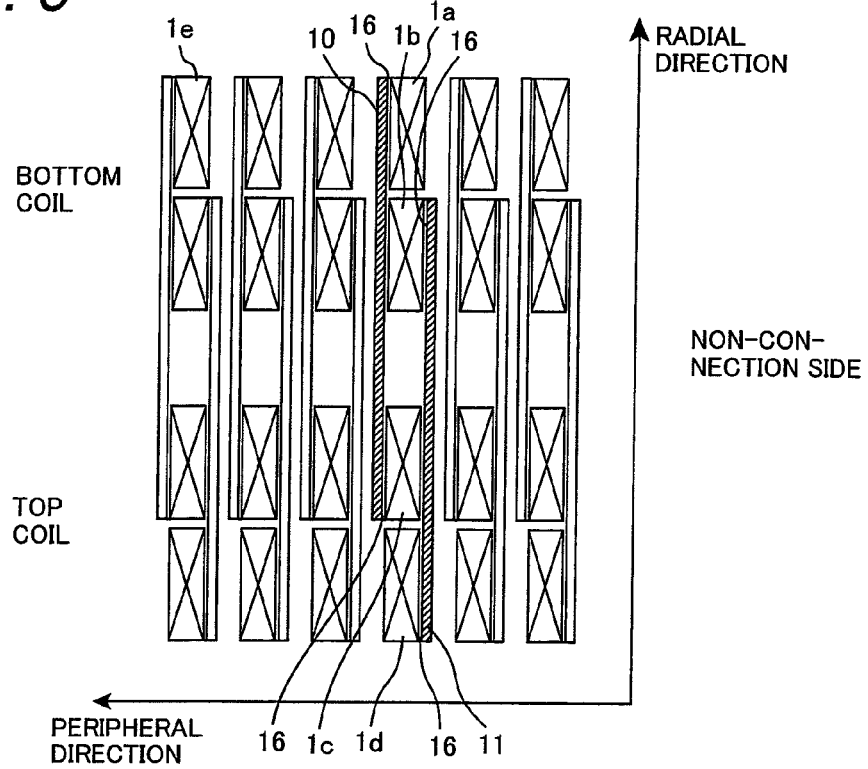
FIG. 6 shows a coil end connecting part of the armature winding of the first embodiment of the present invention at the non-connection side.

FIG. 6 shows a coil end connecting part at the non-connection side 7a (see FIG. 2) which is viewed from the axis of rotation. The horizontal axis indicates the peripheral direction and the vertical axis indicates the radial direction. This figure shows four layers of coils: two layers of bottom coils 4 and two layers of top coils 5. The armature winding 1a of the first layer of the bottom coil is connected to the armature winding 1c of the first layer of the top coil by means of a connecting piece 10 via a connecting spacer 16. Providing a connecting spacer between the connecting piece 10 and the armature windings 1a and 1c can assure electric insulation between the connecting piece 10 and the armature winding 1b of the second layer of the bottom coil. It is possible to provide an insulating spacer (not shown in the figure) between the connecting piece 10 and the armature winding 1b of the second layer of the bottom coil to make the insulation more reliable. The armature winding 1b of the second layer of the bottom coil is connected to the armature winding 1d of the second layer of the top coil by means of a connecting piece 11 via a connecting spacer 16. Providing a connecting spacer between the connecting piece 11 and the armature windings 1b and 1d can assure electric insulation between the connecting piece 11 and the armature winding 1c of the second layer of the bottom coil. It is possible to provide an insulating spacer (not shown in the figure) between the connecting piece 11 and the armature winding 1c of the second layer of the bottom coil to make the insulation more reliable.

Figure 7:
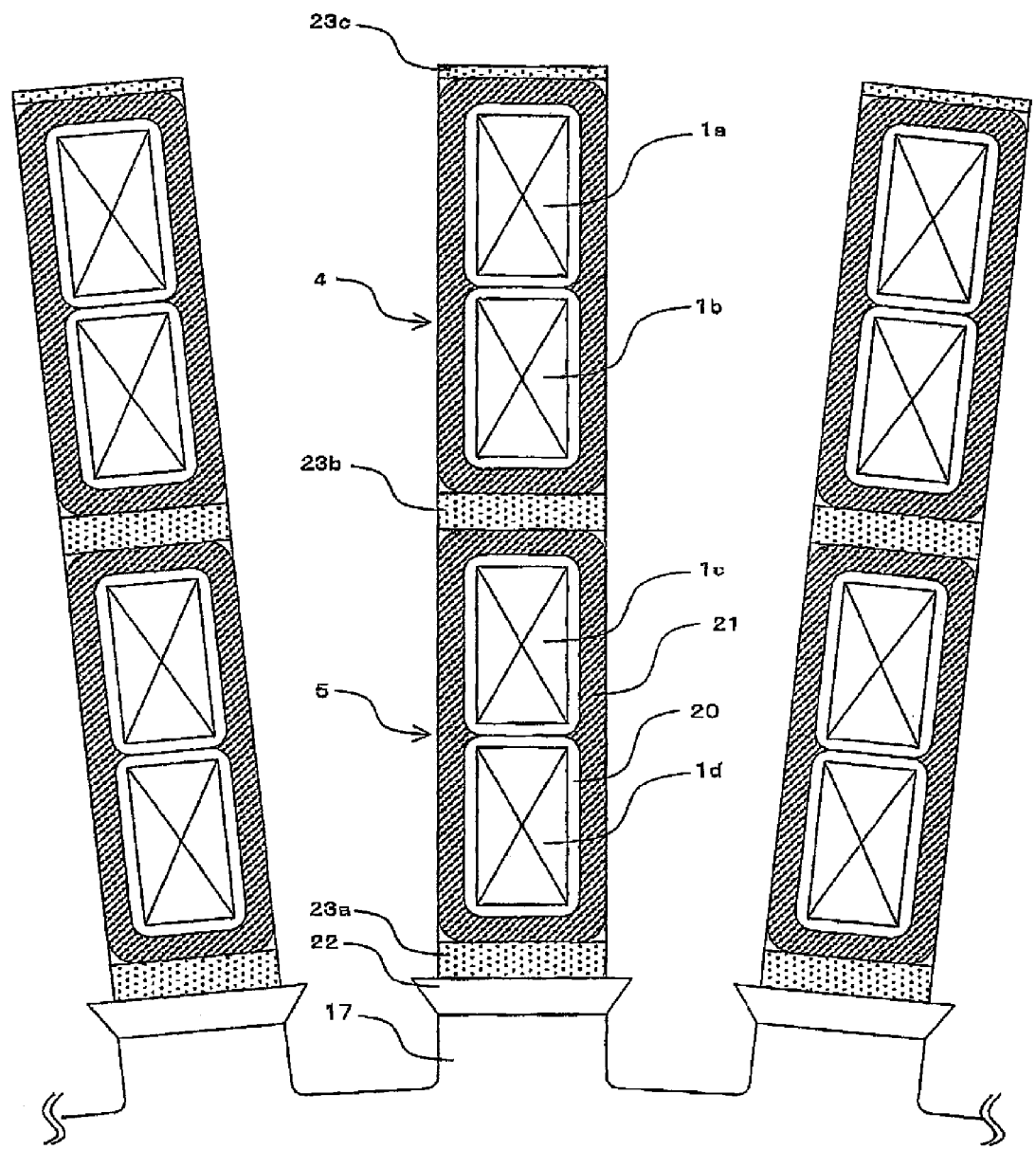
FIG. 7 shows a sectional view of the configuration of armature windings inside a slot related to the present invention.

FIG. 7 shows a sectional view of the configuration of armature windings inside a slot 17. The bottom coil 4 and the top coil 5 respectively are made up of two layers of armature windings 1a, 1b, 1c, and 1d. Two layers of armature windings are electrically insulated each other respectively by an insulator 20. However, since the potential difference between two layers of armature windings is smaller than that between the armature winding and the ground, the dielectric strength of the insulator 20 need not be so high as that of the main insulator 21. The bottom coil and the top coil are respectively insulated from the ground by the main insulator 21, accommodated in the slot 17 (see FIG. 1) together with spacers 23a, 23b, and 23c, and fixed by a wedge 22. Although this embodiment insulates each of the two layers of the armature windings with insulators 20 and then insulates both the armature windings and the insulators 20 with the main insulator 20, it is possible to use the main insulator 21 instead of the insulator 20 to insulate each of the two layers of the armature windings.

As explained above, this embodiment connects four layers of armature windings that constitutes 2-turn coils by forming one turn with the outermost armature winding and the armature winding of the innermost-but-one layer and forming the other turn with the innermost armature winding and the armature winding of the outermost-but-one layer. After a 2-turn coil is set in one slot, the next 2-turn coil is set in another slot.

Further, since a 2-turn coil is formed by connecting every two layers of armature windings that pass through a single slot in series, the total number of windings is doubled. Further, since each phase is made of three parallel circuits, the number of parallel circuits is 3/2. Therefore the output voltage becomes 0.67 times (since the output voltage is a reciprocal of the number of parallel circuits). Therefore this embodiment can provide an electric rotating machine equipped with armature windings that can output a voltage between the voltage (1.0 time) of 1 parallel circuit and the voltage (0.5 time) of 2-parallel circuits. Therefore, this embodiment can provide an intermediate output voltage by an identical output voltage just by changing winding methods instead of changing the length of stator core of the electric rotating machine 100 or the number S of slots to control the output voltage.

Further, since the armature windings that pass through a single slot form 2-turn coils, the coil size per one layer becomes smaller than that of the 1-turn coil. This reduces the interlinking magnetic fluxes of windings. Consequently this can reduce AC losses of armature windings due to the interlinking magnetic fluxes. This also has an effect of increasing the efficiency of the electric rotating machine. Further, since four layers of armature windings are used, the height of coil per layer becomes smaller than that when two layers of armature windings are used. Therefore, this embodiment has an effect of reducing the magnetic flux that interlinks the winding per layer, reducing the AC losses due to magnetic fluxes, and increasing the efficiency of the electric rotating machine.

Embodiment 2

Figure 8:
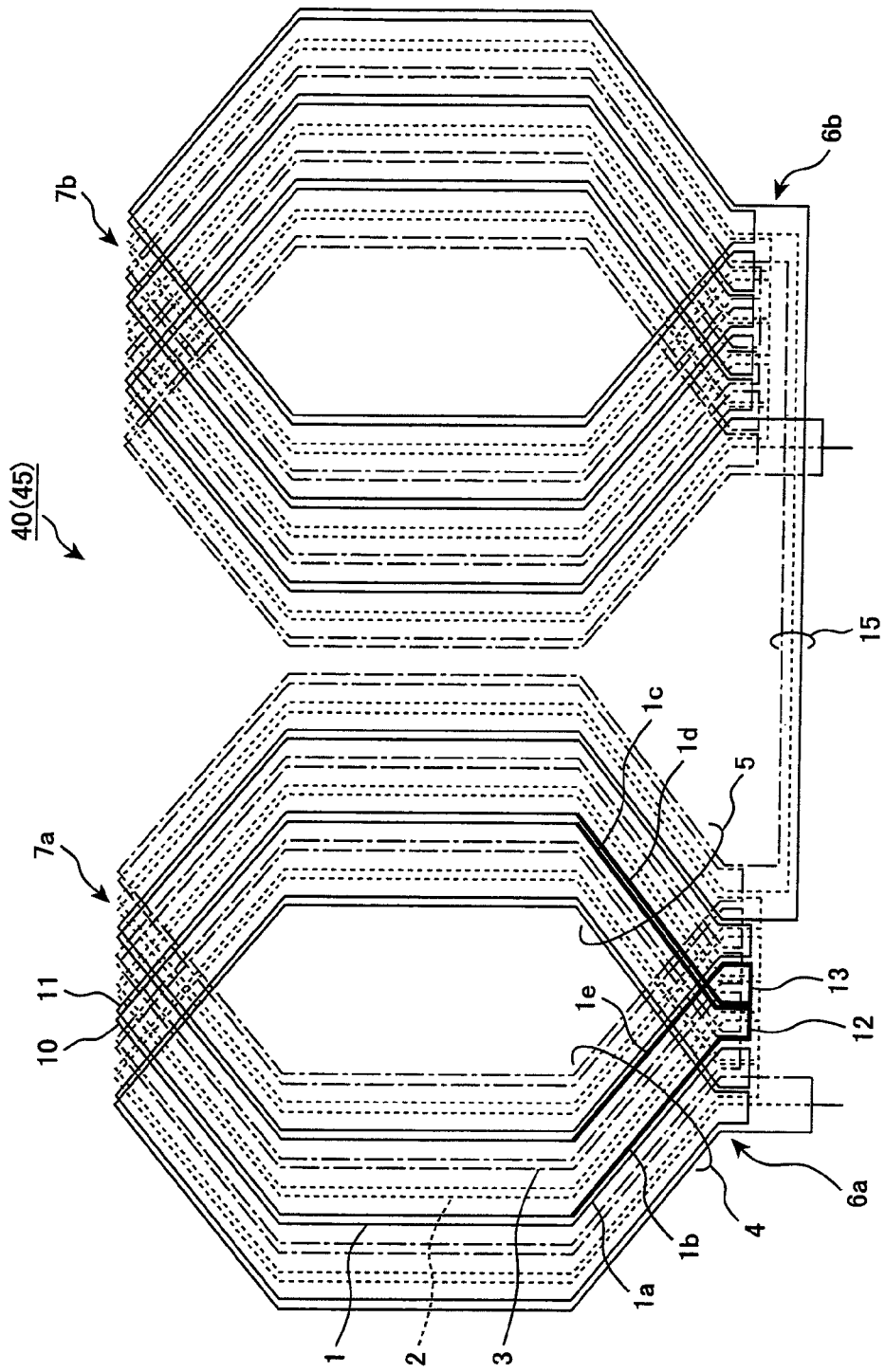
FIG. 8 is a winding diagram of the armature winding which is the second embodiment of the present invention.

FIG. 8 is a schematic diagram of one phase of armature windings of an electric rotating machine that is a second embodiment of the present invention.

The schematic diagram of the electric rotating machine of Embodiment 2 is similar to that of FIG. 1 and its explanation is omitted here. Embodiment 2 of FIG. 8 is almost the same as Embodiment 1 of FIG. 1 but coil pitches at the connection side 6a and the connecting method of Embodiment 2 are different from those of Embodiment 1. Embodiment 1 of FIG. 1 is so constructed that the first turn and the second turn that pass through a single slot are the same in the coil pitch of the armature winding, that coil pitch at the connection side 6a is equal to that at the non-connection side 7a, and that the coil end at the connection side 6a is equipped with a connecting piece 9 of connection pitch of 3.

Embodiment 2 of FIG. 8 is so constructed that the first turn and the second turn that pass through a single slot are the same in the coil pitch of the armature winding, that the number of coil pitches at the connection side 6a is less by one than that at the non-connection side 7a, and that the coil end at the connection side 6a is equipped with two kinds of connecting pieces (connecting piece of connection pitch of 1 and connecting piece of connection pitch of 2). The armature winding 1c of the first layer of the top coil is connected to the armature winding 1b of the second layer of the bottom coil by means of connecting piece 12 of connection pitch of 1 at the connection side 6a. The armature winding 1d of the second layer of the top coil is connected to the armature winding 1e of the first layer of the bottom coil of the next armature winding by means of a connecting piece 13 of connection pitch of 2 at the connection side 6a.

Figure 9:
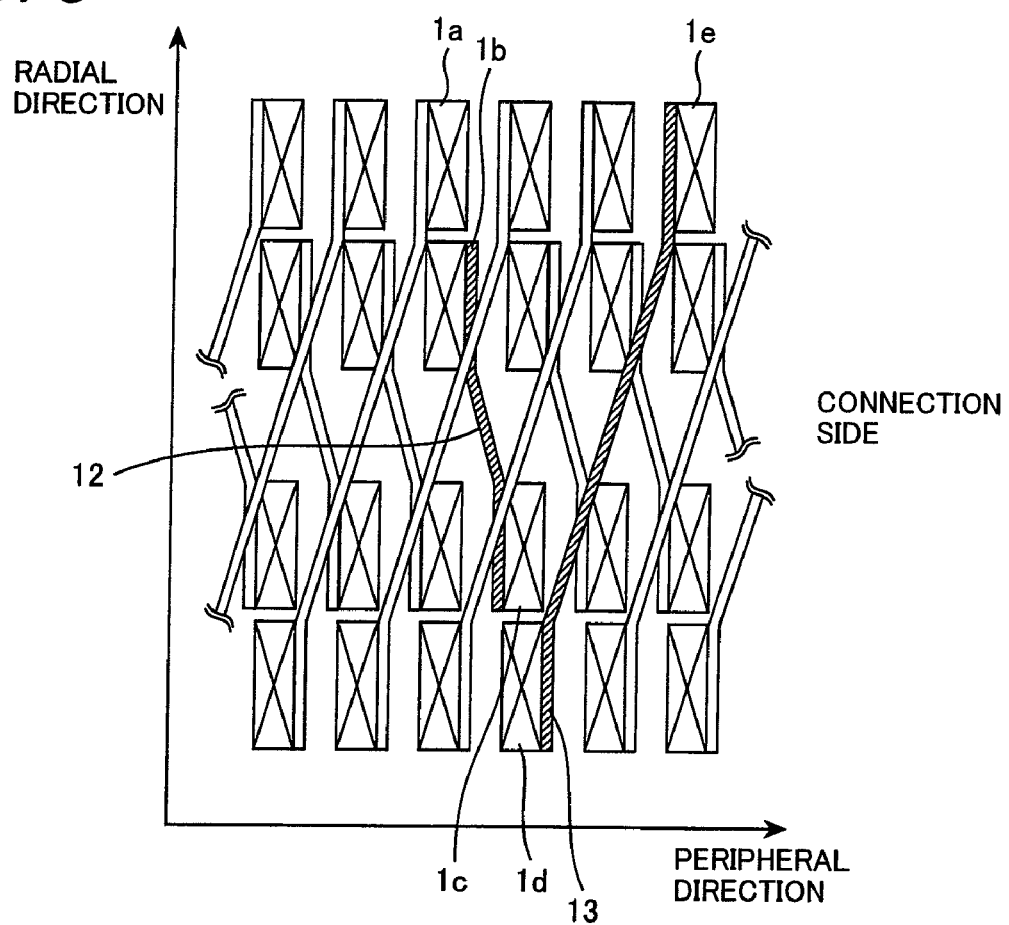
FIG. 9 shows a coil end connecting part of the armature winding of the second embodiment of the present invention at the connection side.

FIG. 9 shows a coil end connecting part at the connection side 6a which is viewed from the axis of rotation. The horizontal axis indicates the peripheral direction and the vertical axis indicates the radial direction. Since the number of coil pitches at the connection side 6a is less by one than that at the non-connection side 7a (see FIG. 8), the armature winding 1a of the first layer of the bottom coil, the armature winding 1b of the second layer of the bottom coil and armature winding 1c of the first layer of the top coil, and the armature winding 1d of the second layer of the top coil are shifted by one in the peripheral direction. At the connection side 6a, the armature winding 1c of the first layer of the top coil is connected to the armature winding 1b of the second layer of the bottom coil by means of connecting piece 12 of connection pitch of one. The armature winding 1d of the second layer of the top coil is connected to the armature winding 1e of the first layer of the bottom coil of the next armature winding by a connecting piece 13 of connection pitch of two. The armature windings are electrically connected to the connecting pieces by brazing or the like. Although Embodiment 1 of FIG. 1 requires a connecting piece 9 of connection pitch of 3, Embodiment 2 uses connecting pieces of connection pitches of one and two. These connecting pieces are shorter and can be connected more easily in a large electric rotating machine, which is a merit.

The configuration of the winding end at the non-connection side 7a (see FIG. 8) in Embodiment 2 is the same as that of FIG. 6. Embodiment 2 has the same advantages as Embodiment 1.

Embodiment 3

Figure 10:
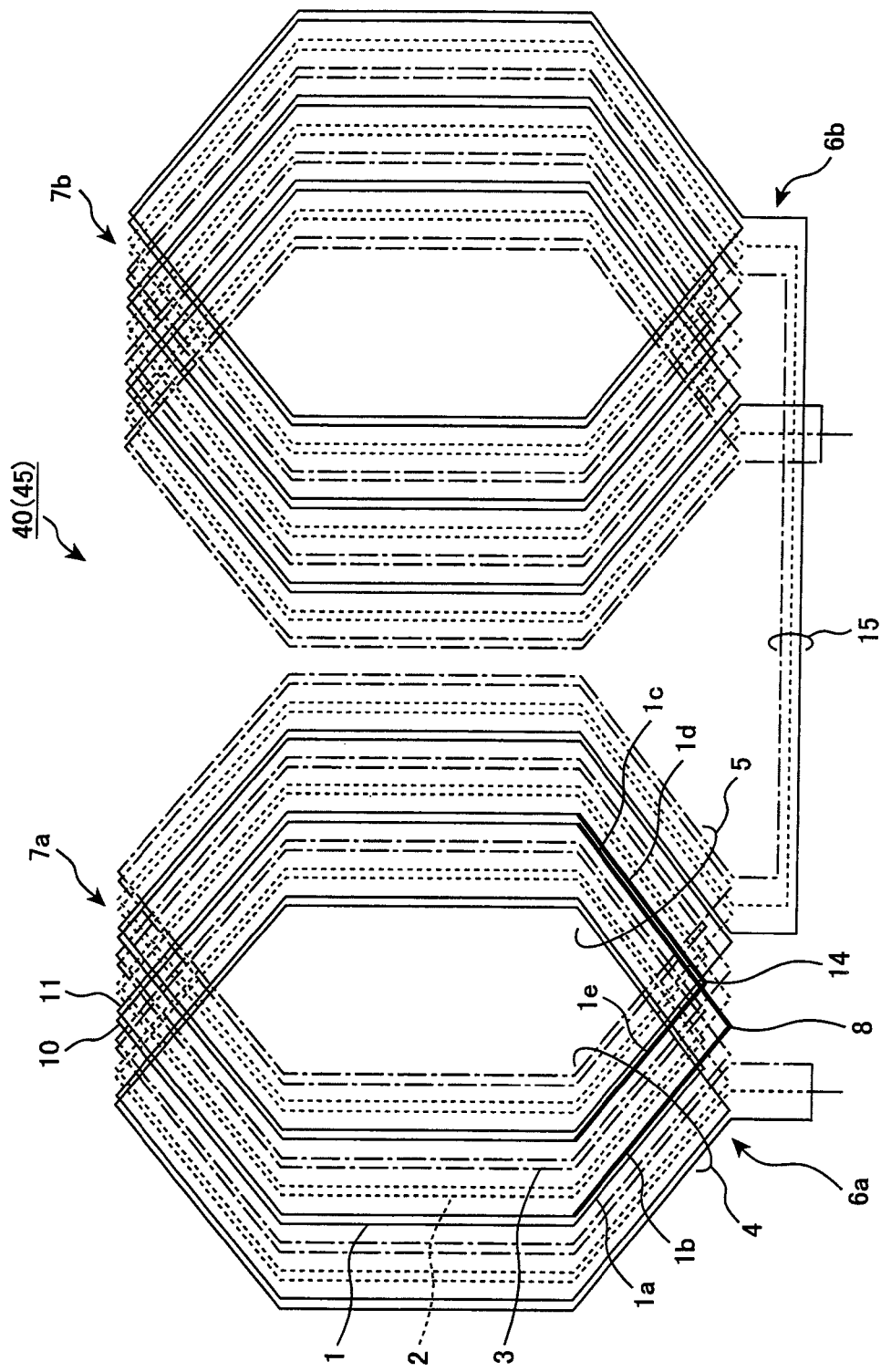
FIG. 10 is a winding diagram of the armature winding which is the third embodiment of the present invention.

FIG. 10 is a schematic diagram of one phase of armature windings of an electric rotating machine that is a third embodiment of the present invention. The schematic diagram of the electric rotating machine of Embodiment 3 is similar to that of FIG. 1 and its explanation is omitted here. Embodiment 3 of FIG. 10 is almost the same as Embodiment 1 of FIG. 1 but coil pitches at the connection side 6a and the connecting method of Embodiment 3 are different from those of Embodiment 1. Embodiment 1 of FIG. 1 is so constructed that the first turn and the second turn that pass through a single slot are the same in the coil pitch of the armature winding, that coil pitch at the connection side 6a is equal to that at the non-connection side 7a, and that the coil end at the connection side 6a is equipped with a connecting piece 9 of connection pitch of 3.

Embodiment 3 of FIG. 10 is so constructed that the first turn and the second turn that pass through a single slot at the non-connection side 7a are the same in the coil pitch of the armature winding, that the number of coil pitches of the first turn of the armature winding that passes through the same slot at the connection side 6a is equal to the coil pitch at the non-connection side 7a, and that the coil pitch of the second turn of the armature winding that passes through the same slot at the connection side 6a is less by three than the coil pitch at the non-connection side 7a. The coil pitch of the armature winding 1c of the first layer of the top coil at the connection side 6a is made equal to that at the non-connection size 7a and the armature winding 1c of the first layer of the top coil is connected to the armature winding 1b of the second layer of the bottom coil. Similarly, the coil pitch of the armature winding 1d of the second layer of the top coil at the connection side 6a is made less by three than that at the non-connection size 7a and the armature winding 1d of the second layer of the top coil is connected to the armature winding 1e of the first layer of the bottom coil of the next armature winding.

Figure 11:
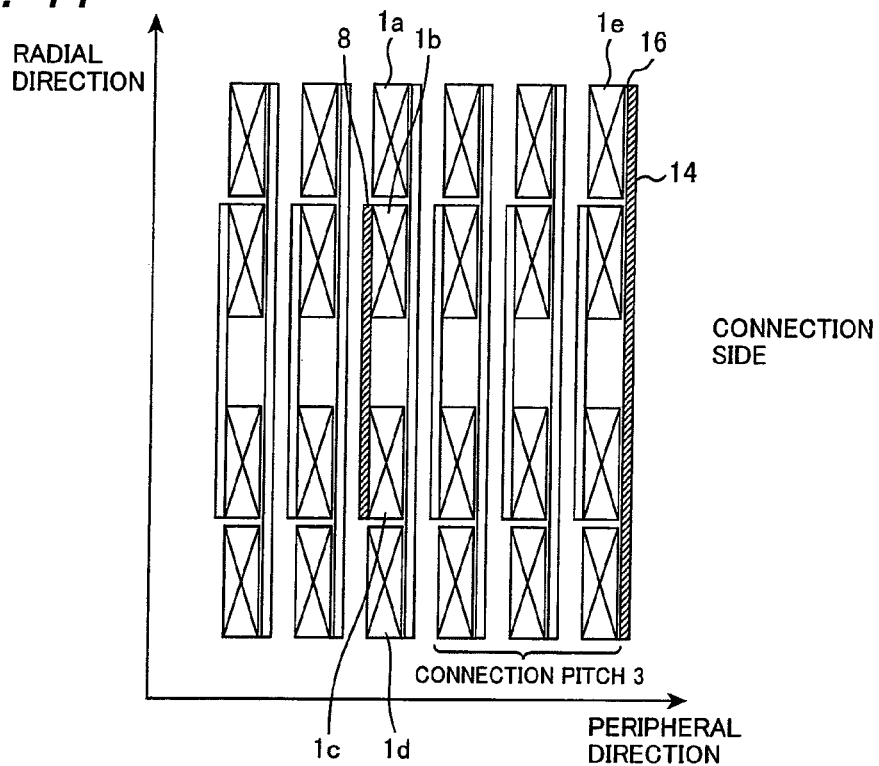
FIG. 11 shows a coil end connecting part of the armature winding of the third embodiment of the present invention at the connection side.

FIG. 11 shows a coil end connecting part at the connection side 6a which is viewed from the axis of rotation. The horizontal axis indicates the peripheral direction and the vertical axis indicates the radial direction. Since the coil pitch of the first turn of the armature winding that passes through the slot at the connection side is equal to the coil pitch at the non-connection side 7a, the armature winding 1a of the first layer of the bottom coil, the armature winding 1b of the second layer of the bottom coil, and armature winding 1c of the first layer of the top coil exist on the same peripheral position. Contrarily, since the coil pitch of the second turn of the armature winding that passes through the slot at the connection side 6a is less by three than the coil pitch at the non-connection side 7a, the position of the armature winding 1d of the second layer of the bottom coil is shifted by three in the peripheral direction from the positions of the armature winding 1a of the first layer of the bottom coil, the armature winding 1b of the second layer of the bottom coil, and the armature winding 1c of the first layer of the top coil and exists on the same peripheral position as the armature winding 1e of the first layer of the bottom coil of the next armature winding. The armature winding 1b of the second layer of the bottom coil is connected to the armature winding 1c of the first layer of the top coil by means of a connecting piece 8. The armature winding 1d of the second layer of the bottom coil is connected to the armature winding 1e of the first layer of the bottom coil by means of a connecting piece 14 via a connecting spacer 16. Embodiment 3 does not require a connecting piece 9 of connection pitch of 3 that is used in Embodiment 1 of FIG. 1, which is a merit. Further, the coil end configuration at the non-connection side 7a is the same as that of FIG. 6. Embodiment 3 can also have the same effect as the configuration of FIG. 2.

Embodiment 4

Figure 12:
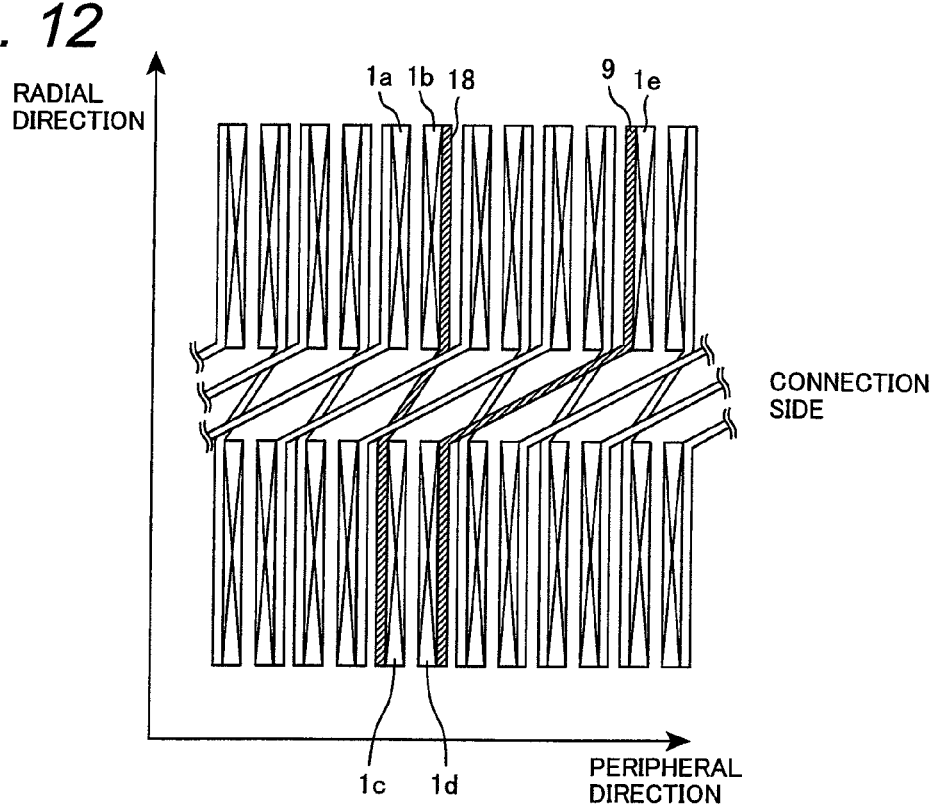
FIG. 12 shows a coil end connecting part of the armature winding of the fourth embodiment of the present invention at the connection side.

FIG. 12 shows a coil end connecting part at the connection side 6a of the armature winding which is the fourth embodiment of the present invention. The horizontal axis indicates the peripheral direction and the vertical axis indicates the radial direction. Although Embodiment 1 of FIG. 2 divides the armature windings into four in the radial direction, Embodiment 4 is so constructed to divide the armature windings into two in the radial direction and into two in the peripheral direction. In other words, the bottom coils at the outer diameter side are disposed in the order of armature winding 1a and armature winding 1b. Since the schematic diagram of the electric rotating machine is the same as FIG. 1, its explanation is omitted. The top coils at the inner diameter side are disposed in the order 1c and 1d. The armature winding 1b of the bottom coil is connected to the armature winding 1c of the top coil by means of a connecting piece 18 of connection pitch of 1. The armature winding 1d of the top coil is connected to the armature winding 1e of the bottom coil of the next armature winding by means of a connecting piece 9 of connection pitch of 3.

Figure 13:
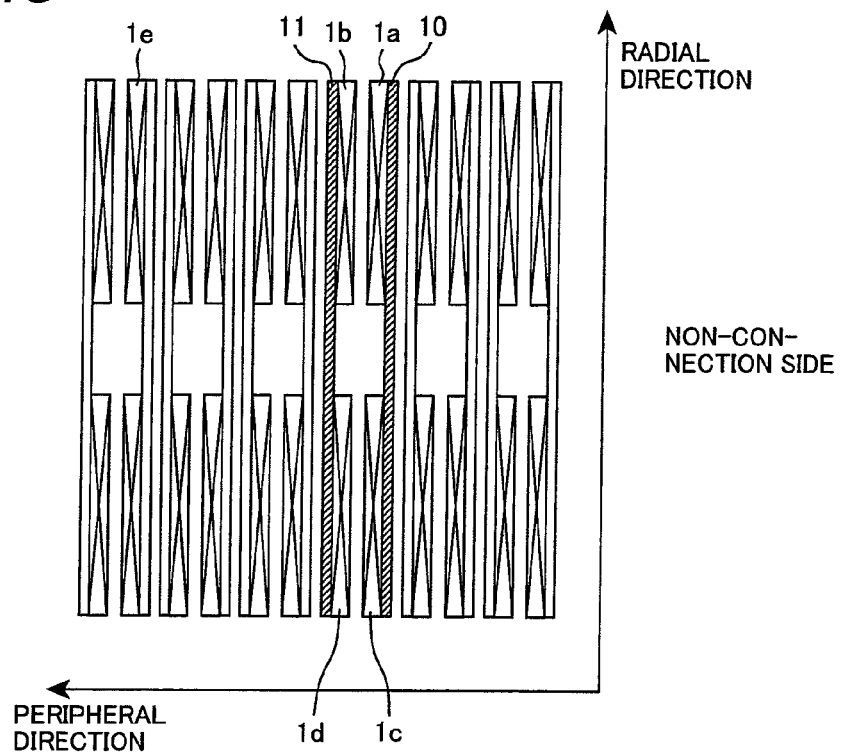
FIG. 13 shows a coil end connecting part of the armature winding of the fourth embodiment of the present invention at the non-connection side.

FIG. 13 shows a coil end connecting part at the non-connection side 7a which is viewed from the axis of rotation. The horizontal axis indicates the peripheral direction and the vertical axis indicates the radial direction. The armature winding 1a of the bottom coil is connected to the armature winding 1c of the top coil by means of a connecting piece 10. The armature winding 1b of the bottom coil is connected to the armature winding 1d of the top coil by means of a connecting piece 11.

Although the connection of this embodiment is the same as that of FIG. 2, connections of FIG. 8 and FIG. 10 can be applied by changing connecting pieces. Embodiment 4 can also have the same effect as Embodiment 1 of FIG. 2.

Embodiment 5

Figure 14:
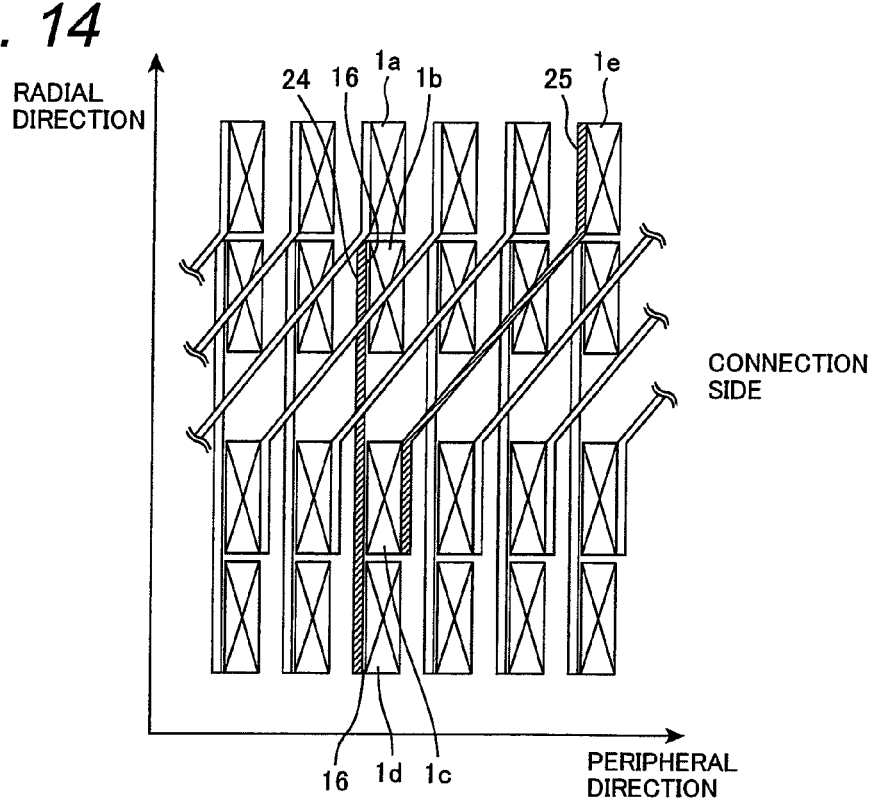
FIG. 14 shows a coil end connecting part of the armature winding of the fifth embodiment of the present invention at the connection side.
Figure 15:
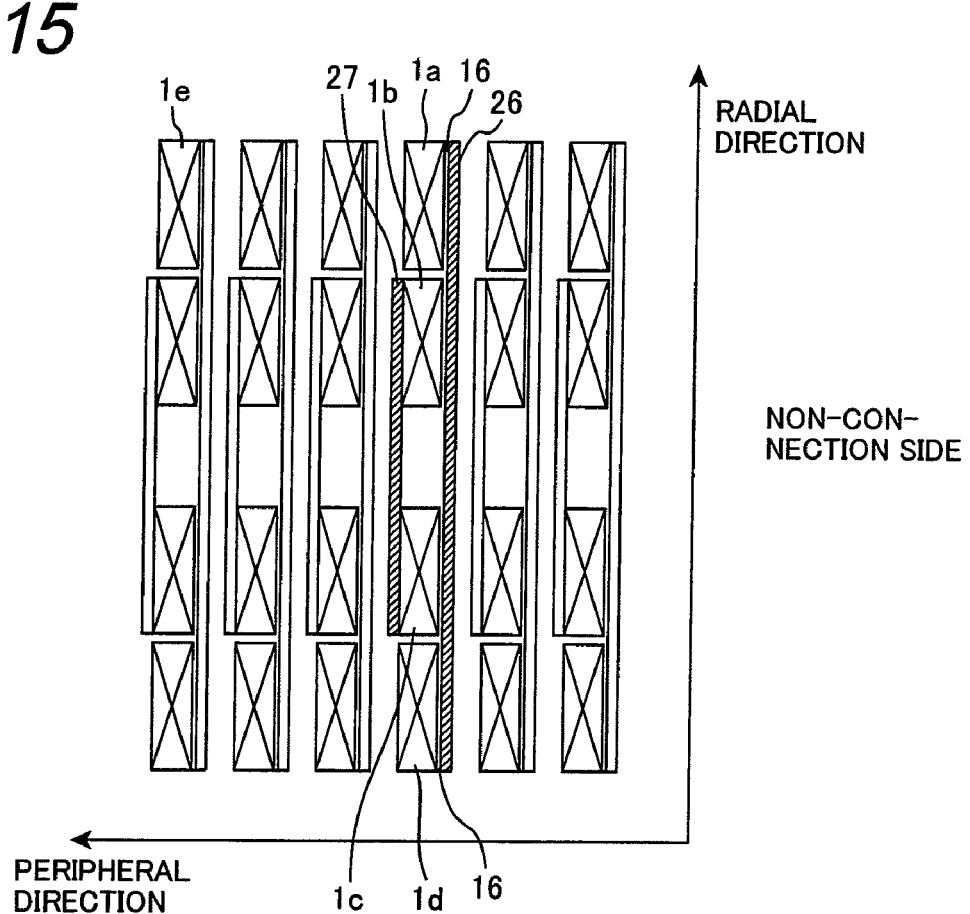
FIG. 15 shows a coil end connecting part of the armature winding of the fifth embodiment of the present invention at the non-connection side.

FIG. 14 and FIG. 15 respectively show coil end connecting parts at the connection side 6a and at the non-connection side 7a of the armature windings which is the fifth embodiment of the present invention. The schematic diagram of the electric rotating machine of Embodiment 5 is similar to that of FIG. 1 and its explanation is omitted here. The embodiment of FIG. 14 and FIG. 15 are the same as the embodiment of FIG. 3 and FIG. 6 but the connection of armature windings are different. The embodiment of FIG. 3 and FIG. 6 is so constructed that one turn of an armature winding that constitutes a 2-turn coil is formed with an armature winding at the outermost diameter side and an armature winding of the innermost-but-one layer and that the other turn is formed with an armature winding at the innermost diameter side and an armature winding of the outermost-but-one layer.

Contrarily, the embodiment of FIG. 14 and FIG. 15 is so constructed that one turn of an armature winding that constitutes a 2-turn coil is formed with an armature winding at the outermost diameter side and an armature winding at the innermost diameter side and that the other turn is formed with an armature winding of the outermost-but-one layer and an armature winding of the innermost-but-one layer.

At the connection side 6a, as shown in FIG. 14, the armature winding 1b of the second layer of the bottom coil is connected to the armature winding 1d of the second layer of the top coil by means of a connecting piece 24 via a connecting spacer 16. The armature winding 1c of the first layer of the top coil is connected to the armature winding 1e of the first layer of the bottom coil of the next armature winding by means of a connecting piece 25 of connection pitch of 3.

At the non-connection side 7a, as shown in FIG. 15, the armature winding 1a of the first layer of the bottom coil is connected to the armature winding 1d of the second layer of the top coil by a connecting piece 26 via a connecting spacer 16. The armature winding 1b of the second layer of the bottom coil is connected to the armature winding 1c of the first layer of the top coil by a connecting piece 27.

Although the connections of Embodiment 5 are the same as those of the embodiment of FIG. 3 and FIG. 5, the connections of FIG. 8 and FIG. 10 can be applied by changing connecting pieces. Embodiment 5 can also have the same effect as the embodiment of FIG. 3 and FIG. 6.

Other Embodiments

The present invention is not limited to the above embodiments and can be modified, for example, as shown below.

(1) Each of the above embodiments uses a 54-slot stator core 30 to form 3 phases, 2 poles, and 3 parallel circuits. However, the present invention is not limited to this. Since the stator core can have slots of the integral multiple of 3·P·N (3 phases, N poles, and P parallel circuits), the stator core can have 18 slots, 36 slots, 54 slots, 72 slots, etc., and other integral multiple of 18 when the generator has 3 phases, 2 poles, and 3 parallel circuits.

(2) Each of the above embodiments uses connecting pieces to connect armature windings. In a small generator, however, it is possible to use only insulated copper wires to form armature windings.

What is claimed is:

1. An electric rotating machine comprising a stator core having a plurality of slots that are formed in an inner peripheral face of the stator and that are equally spaced in the peripheral direction, a rotor that rotates inside the stator core, and armature windings that are disposed in the slots, wherein each of the armature windings comprises a plurality of serially-connected single-turn coils that are respectively disposed in the slots to form serially-connected coils of respective phases, disposed in the slot, wherein the serially-connected coils of respective phases are connected in parallel to one another, wherein each of the armature windings is comprised of three 2-turn coils connected in parallel to form one phase, each 2-turn coil being comprised of two single-turn coils that are serially connected and disposed in a single slot, wherein each single-turn coil comprises two layers connected in series;

wherein the number of slots of the stator core is an integral multiple of 18;

wherein each of the armature windings includes a connection side and a non-connection side;

wherein, for each of the armature windings, a first turn coil pitch of the armature winding disposed in the slot is equal to a second turn coil pitch, and a coil pitch at the connection side that is electrically connected at the coil is equal to a coil pitch at the non-connection side; and wherein coil ends of the armature windings at the connection side are connected via connecting pieces having a connection pitch of three.

2. An electric rotating machine comprising a stator core having a plurality of slots that are formed in an inner peripheral face of the stator and that are equally spaced in the peripheral direction, a rotor that rotates inside the stator core, and armature windings that are disposed in the slots, wherein each of the armature windings comprises a plurality of serially-connected single-turn coils that are respectively disposed in the slots, and wherein the serially-connected coils of respective phases, disposed in the slots, are connected in parallel to one another;

wherein each of the armature windings is comprised of three 2-turn coils connected in parallel to form one phase, each 2-turn coil being comprised of two single-turn coils that are serially connected and disposed in a single slot, wherein each single-turn coil comprises two layers connected in series;

wherein the number of slots of the stator core is an integral multiple of 18, wherein each of the armature windings includes a connection side and a non-connection side;

wherein, for each of the armature windings, a first turn coil pitch of the armature winding at the non-connection side disposed in the slot is equal to a second turn coil pitch;

wherein a coil pitch at the connection side is less by one than a coil pitch at the non-connection side; and wherein coil ends of the armature windings at the connection side are connected via two kinds of connecting pieces, one of which has a connecting piece having a connection pitch of one and the other having a connection pitch of two.

3. The electric rotating machine according to claim 1, wherein the armature winding is divided by four in the radial direction inside the slot.

4. The electric rotating machine according to claim 1, wherein, for each of the armature windings, a first turn comprised of an outermost armature winding and an armature winding of an innermost-but-one layer, and a second turn comprised of an innermost armature winding and an armature winding of an outermost-but-one layer.

5. The electric rotating machine according to claim 1, wherein, for each of the armature windings, a first turn is comprised of an outermost armature winding and an armature winding of an innermost layer, and a second turn is comprised of an armature winding of an outermost-but-one layer and an armature winding of an innermost-but-one layer.

6. The electric rotating machine according to claim 1, wherein the connecting pieces are comprised of a bar-shaped conductive material.

7. The electric rotating machine according to claim 2, wherein the armature winding is divided by four in the radial direction inside the slot.

8. The electric rotating machine according to claim 2, wherein the armature winding is divided by two in the radial direction of the stator core and divided by 2 in the peripheral direction.

9. The electric rotating machine according to claim 2, wherein, for each of the armature windings, a first turn is comprised of an outermost armature winding and an armature winding of an innermost-but-one layer, and a second turn is comprised of an innermost armature winding and an armature winding of an outermost-but-one layer.

10. The electric rotating machine according to claim 2, wherein, for each of the armature windings, a first turn is comprised of an outermost armature winding and an armature winding of an innermost layer, and a second turn is comprised of an armature winding of an outermost-but-one layer and an armature winding of an innermost-but-one layer.

* * * * *